Nov. 15, 1960   R. A. GRAHAM ET AL   2,959,834

MUFFLER CLAMP

Filed June 18, 1958

INVENTORS:

Russell A. Graham,
John C. Larson,

BY Cushman, Darby & Cushman
ATTORNEYS.

ated Nov. 15, 1960

2,959,834

MUFFLER CLAMP

Russell A. Graham, Oak Park, and John C. Larson, Palos Heights, Ill., assignors to Maremont Automotive Products, Inc., Chicago, Ill., a corporation of Illinois Filed June 18, 1958, Ser. No. 742,762

2 Claims. (Cl. 24—277)

This invention relates to clamps and in particular to clamps used for securing an exhaust pipe to a muffler connection pipe.

Various types of clamps adapted to serve a multiplicity of purposes have heretofore been proposed, however, the prior devices capable of being used for the securing or coupling of an exhaust pipe to a muffler connection have certain disadvantages and require somewhat expensive manufacturing steps. For example, it has been previously been proposed to use a muffler clamp comprising a U-bolt having threaded ends, and a saddle consisting of a bottom wall having apertures therein through which the extremities pass and upstanding side walls having concave cut-outs which form a concave seat. Nuts cooperate in such a clamp, with the extremities of the U-bolt and the bottom of the saddle whereby the seat of the saddle may be positioned with respect to the U-bolt to clamp a pipe therebetween. Such prior clamps have inherent strength limitations because the side walls are not coupled together at their upper ends. Moreover, to manufacture such saddles, somewhat of a substantial cost is involved because it is necessary to cut a blank to size and shape, and then fold the side walls upwardly.

Accordingly, it is an object of the present invention to provide a muffler clamp which is not subject to the disadvantages of the prior art clamps.

More particularly, it is an object of the present invention to provide a muffler clamp including a saddle having continuously supported side walls and one which may be formed by a single stamping operation.

Basically, the instant invention provides for a clamp for securing an exhaust pipe to a muffler connection pipe which clamp comprises the combination of a U-bolt having threaded extremities, threaded nuts cooperating with said extremities, and a closed end channeled saddle.

Figure 1:
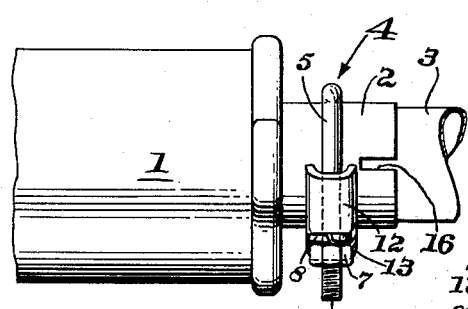
Figure 2:
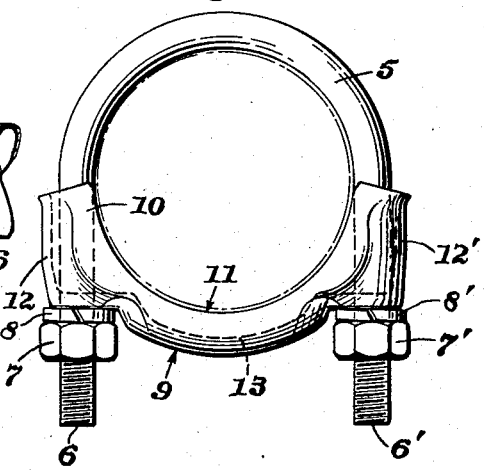
Figure 4:
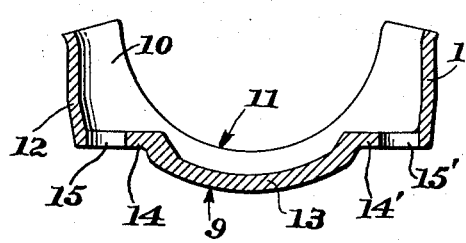
Figure 3:
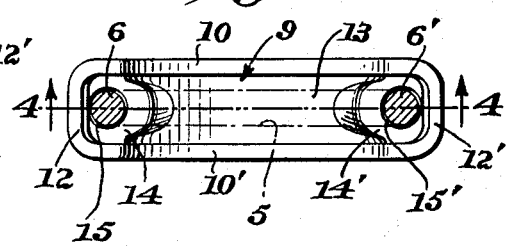

The invention will be readily understood, and objects other than those specifically referred to above will become apparent to those of ordinary skill in the art when consideration is given to the following detailed description and annexed drawings, wherein:

Figure 1 is a side view of a coupling between a muffler and an exhaust pipe utilizing the clamp provided by this invention, Figure 2 is a front elevational view of the clamp provided by this invention, Figure 3 is a plan view of the saddle part of the clamp provided by this invention, and Figure 4 is a cross-sectional view of the saddle shown in Figure 3, Figure 4 being taken on the line 4—4 of Figure 3.

In Figure 1 a muffler 1 having a connection pipe 2 is shown coupled to an exhaust pipe 3. The exhaust pipe 3 may be one communicating with the cylinders of an engine or one communicating with the atmosphere. The pipes 2 and 3 are securely clamped in position by a muffler clamp 4 constructed in accordance with the teachings of this invention.

The clamp 4, as shown in Figure 2, comprises a U-bolt 5 having threaded extremities 6 and 6', hexagonal nuts 7 and 7' threaded upon extremities 6 and 6', lock washers 8 and 8' surrounding extremities 6 and 6' above nuts 7 and 7', and a saddle 9 having apertures through which the extremities 6 and 6' extend.

The saddle 9, as shown in Figures 3 and 4 has side walls 10 and 10' forming a channeled concave seat generally designated by the numeral 11, end walls 12 and 12' and an arcuate bottom wall 13 connecting the side walls 10 and 10', and planar seats 14 and 14' for the lock washers 8 and 8' respectively. The seats 14 and 14' are provided with apertures 15 and 15' so as to allow for passage therethrough of extremities 6 and 6'. Of course, the seats preferably receive the lock washers, but it should be understood that the lock washers may be eliminated such that the seats receive the nuts without departing from the scope and spirit of the invention.

In operation, an exhaust pipe such as that designated as 3 in Figure 1 would be coupled to a muffler connection pipe such as that designated by 2 and the U-bolt would be placed around the joint. The saddle would be placed in position with the extremities of the U-bolt extending through apertures 15, 15'. Nuts 7 and 7' would then be tightened against the seats 14 and 14', or if washers 8 and 8' are used, against the washers which rest on the seats. As the nuts are tightened the top of the U-bolt 4 and the channeled concave seat 11 would engage the pipe 2 and press the same against pipe 3 whereby a tight frictional fit and a secure joint are obtained. Slots such as that designated by numeral 16 may be provided, in the end of the connection pipe as is customary in the trade, to allow for the reduction of cross-sectional area caused by the clamping.

By virtue of the structural characteristics of the saddle, it can easily be formed by a suitably shaped die in a stamping apparatus, and thus manufacturing costs are reduced to a minimum. Of course, the saddle is preferably an integral structure.

From the foregoing description, it should be apparent that a strong, easily and cheaply manufactured clamp is provided by this invention. Also, it will be apparent that the objects above set forth are accomplished and that various modifications may be made within the spirit of the invention. Accordingly, it is intended that when consideration is given to the appended claims, they be interpreted as illustrative and not in a limiting sense.

We claim:

1. A clamping assembly for securing an exhaust pipe to a muffler connection pipe comprising a U-bolt having threaded extremities; a channeled saddle including a curved bottom wall having a planar seat at either end thereof, side walls integral with said bottom wall and extending upwardly therefrom to define a pair of spaced arcuate seats of a curvature complementary with said bottom wall for peripherally engaging a portion of one of said pipes, end walls integral with said bottom wall and said side walls and extending upwardly from said planar seats of said bottom wall and transversely to said side walls; said saiddle having an aperture formed in each of said planar seats of said bottom wall adjacent each end wall for receiving the threaded extremities of said U-bolt, and a clamping nut threadedly cooperating with each of said extremities and bearing against the underside of said planar seats of said bottom wall for clamping said U-bolt and saddle around said pipes.

2. A clamping device as defined in claim 1 wherein said arcuate seats are substantially semi-circular.

References Cited in the file of this patent

UNITED STATES PATENTS

| 1,940,263 | McLaughlin | Dec. 19, 1933 |
| 2,432,635 | Van Ryan | Dec. 16, 1947 |
| 2,719,345 | Riker | Oct. 4, 1955 |